I. PIERCE.
Scoop.

No. 208,199. Patented Sept. 17, 1878.

Attest:
A. Helfthel
H. J. Sprague

Inventor.
Isaac Pierce
By Atty
Thos. S. Sprague

UNITED STATES PATENT OFFICE.

ISAAC PIERCE, OF ALMA, MICHIGAN.

IMPROVEMENT IN SCOOPS.

Specification forming part of Letters Patent No. 208,199, dated September 17, 1878; application filed May 9, 1878.

*To all whom it may concern:*

Be it known that I, ISAAC PIERCE, of Alma, in the county of Gratiot and State of Michigan, have invented an Improvement in Shovels or Scoops, of which the following is a specification:

The nature of my invention relates to new and useful improvements in the construction of wooden shovels of that class where the sides are turned up so as to make what is usually denominated a "scoop-shovel," when made of sheet iron or steel.

The invention consists of such a shovel, the blade of which is made of wood-veneer bent to the required shape, substantially as more fully hereinafter described.

Figure 1:
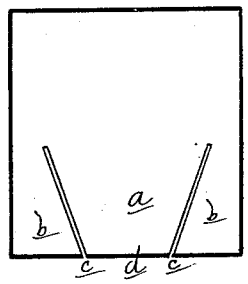
Figure 2:
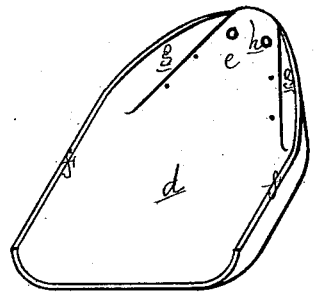
Figure 3:
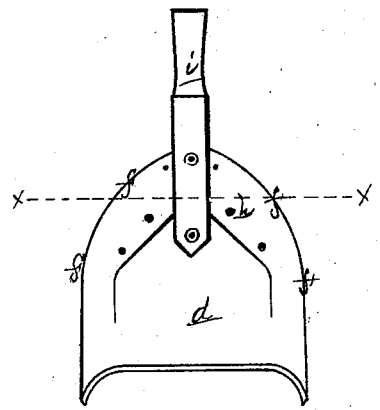
Figure 4:
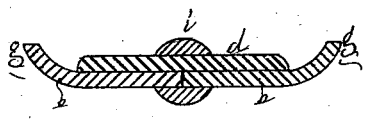

Referring to the drawings, Figure 1 represents a piece of wood-veneer ready to be bent into shape. Fig. 2 is a front perspective view of the piece of veneer shown in Fig. 1, bent to shape. Fig. 3 is a rear plan view of the same. Fig. 4 is a cross-section on the line $xx$ in Fig. 3.

In the drawings which accompany and form a part of this specification there is shown a piece of wood-veneer, partially divided into three sections, $a\ b\ b$, by the diagonal cuts $c\ c$. After being suitably steamed or saturated this veneer is bent to shape upon a proper form, so that the strip $d$ forms the center of the implement, with an upward bend, $e$, to form the head, while the sides $f$ are turned up, as shown, and the strips $g$, being a continuation of the sides, are bent into the form shown to form the sides of the head, behind which they are secured by the rivets $h$. The handle $i$, as shown, is bifurcated at its lower end by a saw-cut, and then slipped onto the head, as shown in Figs. 3 and 4, and secured in place by rivets.

I do not desire to confine myself to this manner of attaching and securing the handles, as this may be varied to suit without departing from the spirit of my invention.

I am aware that shovels have been made from a piece of flat wood by bending up one end and attaching a handle thereto; but such I do not claim; but What I do claim as my invention, and desire to secure by Letters Patent, is—

As a new article of manufacture, a scoop-shovel made of wood-veneer, bent from one piece so as to form the blade, with upturned sides extending around the upturned head, substantially as described.

ISAAC PIERCE.

Witnesses:
C. L. HALL,
JAMES T. HALL.